US 8,253,354 B2

(12) United States Patent
Niemi

(10) Patent No.: US 8,253,354 B2
(45) Date of Patent: Aug. 28, 2012

(54) METHOD AND APPARATUS FOR TRANSFERRING SIGNAL DATA

(75) Inventor: Mika Niemi, Helsinki (FI)

(73) Assignee: ABB Oy, Helsinki (FI)

( * ) Notice: Subject to any disclaimer, the term of this patent is extended or adjusted under 35 U.S.C. 154(b) by 609 days.

(21) Appl. No.: 12/338,406

(22) Filed: Dec. 18, 2008

(65) Prior Publication Data

US 2009/0177295 A1 Jul. 9, 2009

(30) Foreign Application Priority Data

Dec. 18, 2007 (FI) ...................................... 20075931

(51) Int. Cl.
*H04Q 9/00* (2006.01)
*G05D 1/02* (2006.01)

(52) U.S. Cl. ........... 318/16; 318/280; 318/630; 318/685
(58) Field of Classification Search .................... 318/16, 318/685, 696, 563, 280, 630, 807, 560; 375/285, 375/260, 267; 455/59, 101
See application file for complete search history.

(56) References Cited

U.S. PATENT DOCUMENTS

| | | | | |
|---|---|---|---|---|
| 5,228,009 A * | 7/1993 | Forestieri et al. | ............. | 367/135 |
| 5,391,970 A | 2/1995 | Chaffee et al. | | |
| 6,028,428 A * | 2/2000 | Cunningham et al. | ........ | 324/314 |
| 6,271,641 B1 * | 8/2001 | Yasohara et al. | ............. | 318/685 |
| 6,912,476 B2 | 6/2005 | Huber-Lenk et al. | | |
| 6,988,116 B2 * | 1/2006 | Corless et al. | ................ | 708/300 |
| 6,996,380 B2 * | 2/2006 | Dent | ............................. | 455/101 |
| 7,224,942 B2 * | 5/2007 | Dent | ............................... | 455/69 |
| 7,382,718 B2 * | 6/2008 | Chang et al. | .................. | 370/204 |
| 7,437,201 B2 * | 10/2008 | Cullen | ........................... | 700/29 |
| 7,506,179 B2 * | 3/2009 | Templeton | .................... | 713/300 |
| 7,688,973 B2 * | 3/2010 | Akiyama et al. | ................ | 380/30 |
| 7,730,332 B1 * | 6/2010 | Templeton | .................... | 713/300 |
| 7,787,623 B2 * | 8/2010 | Akiyama et al. | ................ | 380/44 |
| 7,793,194 B2 * | 9/2010 | Seo et al. | ...................... | 714/776 |
| 7,986,744 B2 * | 7/2011 | Efimov et al. | ................. | 375/285 |
| 8,009,083 B2 * | 8/2011 | Shirakawa | ..................... | 342/118 |
| 2002/0147510 A1 | 10/2002 | Francis | | |
| 2003/0054828 A1 * | 3/2003 | Dent | ............................. | 455/450 |
| 2003/0087617 A1 * | 5/2003 | Shohara | ..................... | 455/192.2 |
| 2003/0092456 A1 * | 5/2003 | Dent | ............................ | 455/503 |
| 2003/0195910 A1 * | 10/2003 | Corless et al. | ................ | 708/322 |
| 2004/0056611 A1 * | 3/2004 | Mayhew et al. | ................ | 318/16 |
| 2004/0056615 A1 * | 3/2004 | Jonsson et al. | ................ | 318/434 |
| 2004/0056619 A1 * | 3/2004 | Jonsson et al. | ................ | 318/440 |
| 2004/0056631 A1 * | 3/2004 | Derksen | ....................... | 318/727 |
| 2004/0135534 A1 * | 7/2004 | Cullen | .......................... | 318/609 |
| 2004/0201279 A1 * | 10/2004 | Templeton | ...................... | 307/11 |

(Continued)

OTHER PUBLICATIONS

Finnish Search Report.

*Primary Examiner* — Paul Ip

(74) *Attorney, Agent, or Firm* — Buchanan Ingersoll & Rooney PC

(57) ABSTRACT

The invention relates to a method and device for transferring signal data from a sender to one or more receivers. The invention includes receiving a quantity as a function of time, arranging the quantity into a first polynomial to obtain values for polynomial coefficients of a first continuous signal, and transferring the values of the polynomial coefficients of the first continuous signal via a first data transfer link to one or more receivers.

13 Claims, 5 Drawing Sheets

U.S. PATENT DOCUMENTS

| | | |
|---|---|---|
| 2004/0207344 A1* | 10/2004 | Derksen .......................... 318/16 |
| 2005/0024138 A1* | 2/2005 | White et al. .................. 330/149 |
| 2005/0271203 A1* | 12/2005 | Akiyama et al. ............... 380/30 |
| 2006/0049793 A1* | 3/2006 | Mayhew ........................ 318/800 |
| 2006/0200732 A1* | 9/2006 | Dobbek et al. ................ 714/782 |
| 2006/0294479 A1 | 12/2006 | Koch |
| 2007/0127412 A1* | 6/2007 | Dent ............................. 370/329 |
| 2007/0153930 A1* | 7/2007 | Reid .............................. 375/260 |
| 2007/0214202 A1 | 9/2007 | Beylkin |
| 2008/0019511 A1* | 1/2008 | Akiyama et al. ................ 380/30 |
| 2008/0240280 A1* | 10/2008 | Li .................................. 375/267 |
| 2009/0021205 A1* | 1/2009 | Cullen .......................... 318/561 |
| 2009/0077446 A1* | 3/2009 | Seo et al. ...................... 714/755 |

* cited by examiner

METHOD AND APPARATUS FOR TRANSFERRING SIGNAL DATA

BACKGROUND OF THE INVENTION

The invention relates to information technology and especially to the compensation and minimization of delays in the data transmission of information technology.

PRIOR ART

In automation systems, data is usually transferred by measuring an analogue quantity, such as position information, speed, voltage or current, from a circuit board A, sampling a measuring signal at certain sampling time instants, and quantizing and coding the signal into numerical values in digital format. After this, the digital signal is transferred one sample at a time by using a digital parallel or series link to a circuit board B, where the signal is used for different purposes. All data transfer links cause delays in data transfer. In some links, the delay also varies randomly or pseudo-randomly. If the samples are examined at the receiving end without information on the sampling time, the signal has temporal uncertainty.

The uncertainty and delay described above is today compensated for computationally by predicting, i.e., extrapolating, the signal past the latest sample. However, the receiving system and its software must then know the delay caused by the link so as to predict correctly. In addition, the extrapolation increases the complexity of the receiving system. Because each sample is transferred as such in the data transfer link, high data transfer capacity is required.

FIG. 1 shows the implementation of position control according to the prior art. The function 1-2 of the target position and the measuring 1-4 of the actual position are shown discretely as a function of time. The samples of the target position representation and the measurement of the actual position are collected 1-6, 1-8. From both the setting and the measurement, one sample is taken at a time and a PID (Proportional Integral Derivative) control is done 1-10. The control produces a torque 1-12 that is directed to a motor 1-14. According to FIG. 1, the position information is always processed in discrete time throughout the chain. The PID controller then also works on samples representing individual time instants.

U.S. Pat. No. 6,912,476 describes an arrangement for determining the position of a moving object. Position information is obtained at regular intervals from the object, and at least two samples are used to define a polynomial function. At the time of an external trigger pulse, the value of the polynomial is calculated and delivered to the requestor.

U.S. Pat. No. 5,391,970 describes an arrangement in which two samples of position information are transferred via a data transfer link, and extrapolation for compensating for the data transfer delay is performed at the receiving end.

A problem with the above methods and systems is that the sample values are outdated and, therefore, erroneous by the time they arrive at the PID controller. In addition to this, when using extrapolation, the properties of the data transfer link need to be known—which is not always possible—and it is difficult to compensate for the effect of jitter.

BRIEF DESCRIPTION OF THE INVENTION

It is an object of the invention to develop a method and an apparatus implementing the method so as to solve the above-mentioned problems. Another object of the invention is to produce between the sending and receiving systems a link in which sample information input at the sending end is immediately displayed at the receiving end without any temporal delay even after calculations required by PID control. The object of the invention is achieved by a method and system that are characterised by what is stated in the independent claims. Preferred embodiments of the invention are disclosed in the dependent claims.

The invention is based on removing from the sampled signal for instance the speed or position information, the delay caused by digital data transfer, and temporal uncertainty. This is achieved by depicting the signal throughout the data transfer chain, including data transfer and calculations of the PID control, as a temporally continuing signal in polynomial format by means of polynomial coefficients.

The invention and its preferred embodiments provide the advantages, for instance, that the sender may input a new sample at any time and using any sampling frequency, and the receiver may read the signal value at any time either randomly or regularly. The data transfer rate and delay of the physical link may be as required on the condition, however, that the accuracy of the received information improves as the capacity increases.

BRIEF DESCRIPTION OF FIGURES

The invention will now be described in greater detail by means of preferred embodiments and with reference to the attached drawings, in which.

DETAILED DESCRIPTION OF THE INVENTION

Figure 1:
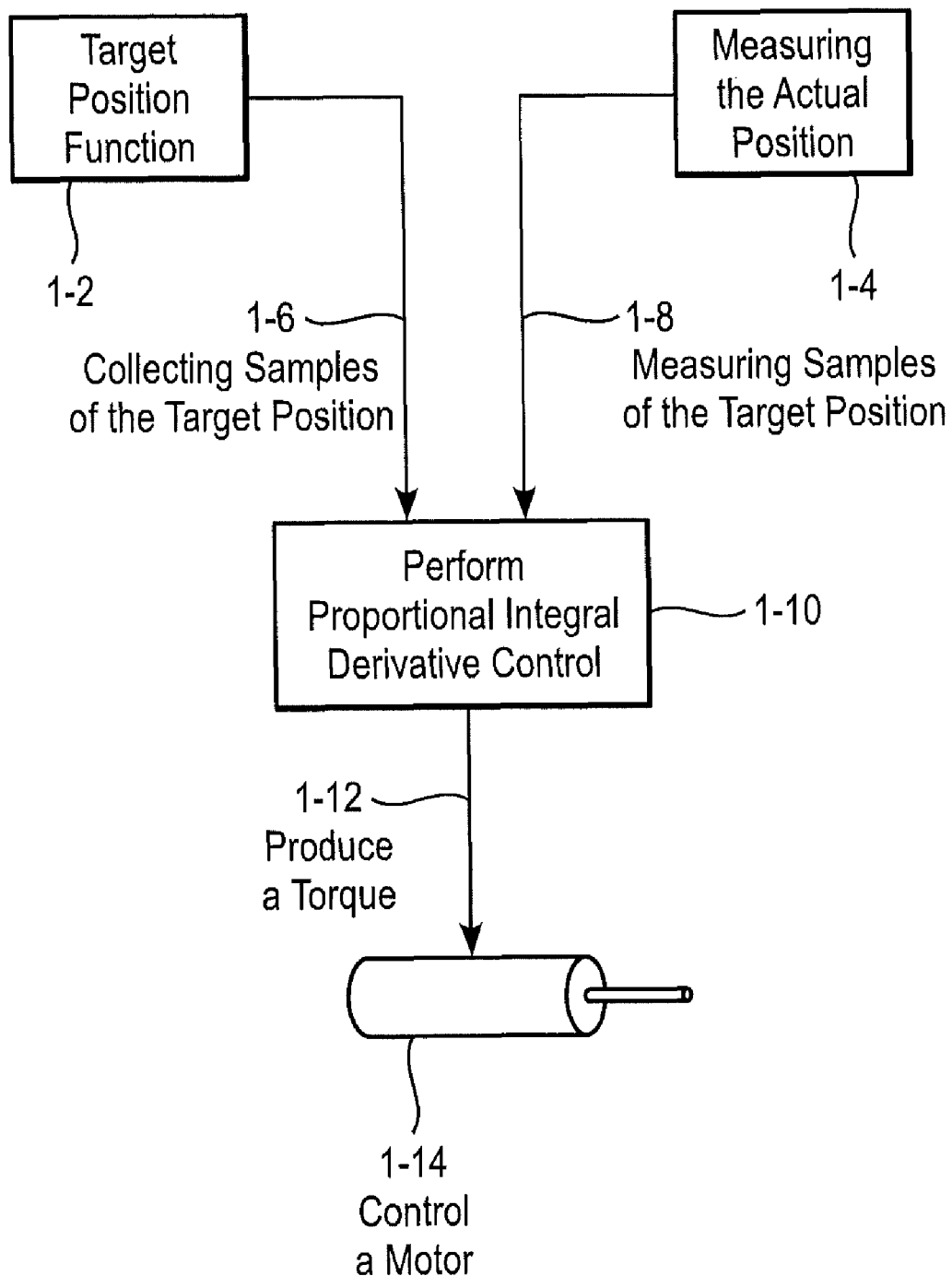
FIG. 1 shows the implementation of position control according to the prior art.
Figure 2:
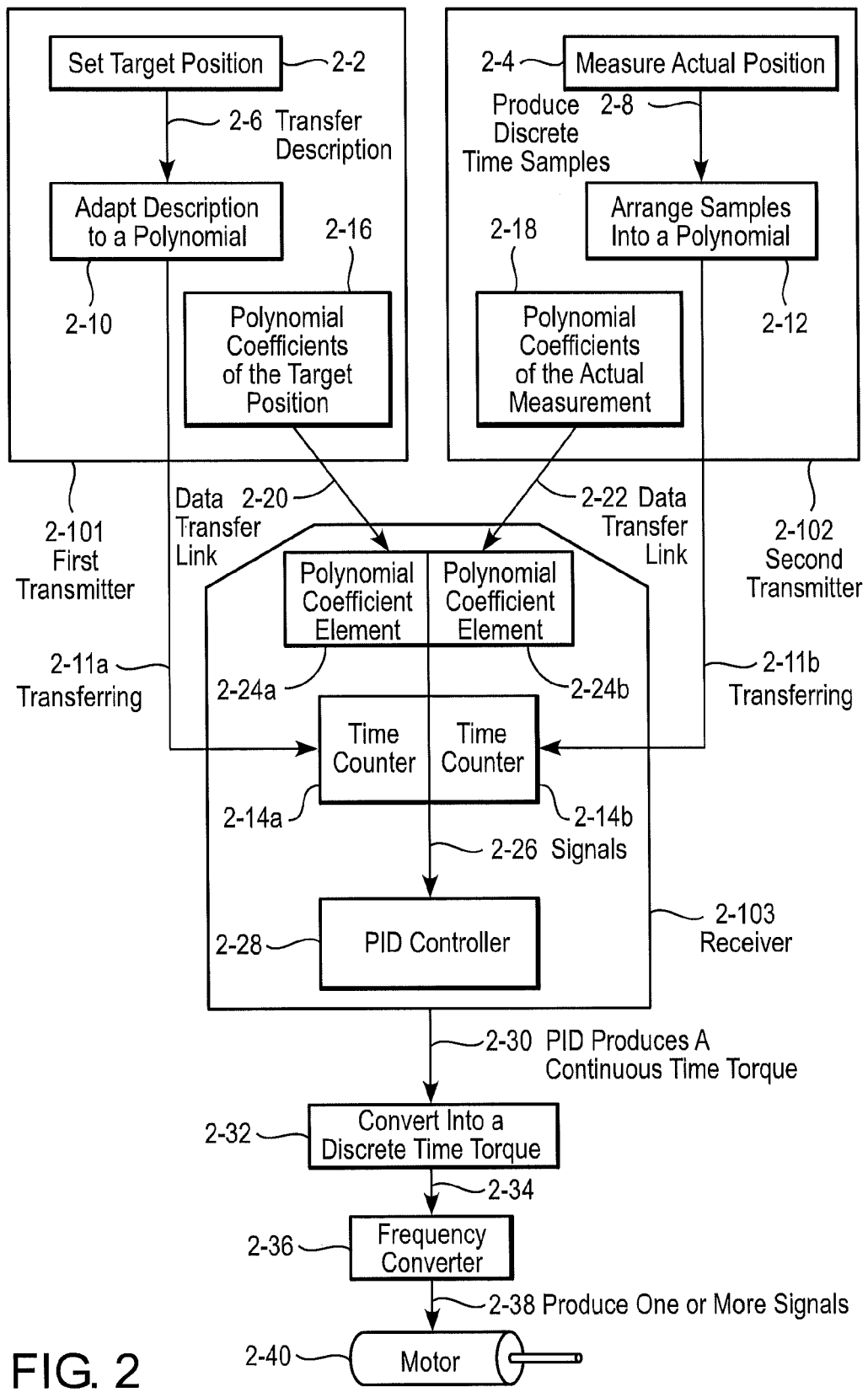
FIG. 2 shows the implementation of position control according to the invention and its preferred embodiments.

FIG. 2 shows the implementation of position control according to the invention and its preferred embodiments. The adjustable, guidable, or controllable quantity may be any quantity, and is not restricted to position control. In addition, there may be one or more adjustable quantities. A variable according to which the quantity is described may be time, another variable, or a combination of variables. In FIG. 2, the target position may be set 2-2 by information engineering and described continuously or discretely as function of time. The description may be a description of the position of three different time instants, for example. The description may be transferred 2-6 to an element to adapt the description to a polynomial 2-10. The arrangement may be done using equation calculation or matrix calculation, i.e., matrix calculation, for example, may be used in defining the coefficients of the polynomial. For instance, from a group of three equations, the unknown factors may be solved. This produces the coefficients of the polynomial and the polynomial, i.e., the continuous-time signal at the sending end. Correspondingly, the measurement of the actual position 2-4 may produce 2-8 discrete-time samples that are transferred to an element 2-12 to arrange the samples into a polynomial and to obtain a continuous-time signal. The continuous-time signals of the setting of the target position and the measurement of the actual position may be described with one or more polynomials or polynomial coefficients. According to a preferred embodiment, discrete-time samples are taken from the position signal, the samples are transferred to a matrix from which the polynomial coefficients of the signal are obtained by matrix calculation. The thus formed polynomial depicts a temporally continuous signal. The target value of the quantity may be described as a first function of time and the measured value of the quantity as the second function of time. The functions may also be similar or same functions of time.

In the next step, the continuous-time signals may be transferred to one or more receivers 2-103 for instance by transferring 2-11a from a first transmitter 2-101 and transferring 2-11b from a second transmitter 2-102 the polynomial coefficients of the signals to a receiver or receiving end. In addition to this, synchronization pulses may be provided at time instant t=0 to synchronize the transfer(s). Together with the data transfer link, a synchronization signal may also arrive to indicate that a new polynomial of the actual position has been calculated. It should be noted that synchronization signals from different sources may arrive at different time instants. When the actual time instant is for instance the time instant when the time variable value of the polynomial is zero (t=0), the element 2-12 transfers 2-11b a synchronization mark to a time counter element 2-14b whose prevailing value is stored into memory tm. This value tm is the time difference between the time counter 2-14b and the zero point of the polynomial 2-12. When the element 2-10 transfers 2-11a the synchronization mark to the time counter element 2-14a, the prevailing counter value of the time counter element is stored into memory tt. This value tt is the time difference between the time counter 2-14a and the zero point of the polynomial 2-10. Polynomial coefficients 2-16 of the target position setting may be transferred via a data transfer link 2-20 to a polynomial coefficient element 2-24a and polynomial coefficients 2-18 of the actual position measurement may be transferred via another or the same data transfer link 2-22 to a polynomial coefficient element 2-24b. If the data transfer links are the same, the synchronization signal may travel in the same link with the polynomial coefficients. In other words, the polynomial coefficients may travel via one or more data transfer links from the sending end to the receiving end and the synchronization signal via a data transfer link of its own or via the data transfer link used by the polynomial coefficients. If there are more than one synchronization signals, they may arrive simultaneously or at different times via the same route or different routes. A synchronization mark or marks may thus be received only from a first element, only from a second element, only from an external element, or from several of these elements. The time counter value may be stored at the time of receipt of the mark. When producing a control function for a control element, it may be implemented on the basis of the value of one or more continuous-time polynomial coefficients and/or one or more time counter values of the receiving end.

As described above, when the synchronization signal arrives at the receiving end, the prevailing time value may be stored in one or more variables, memory locations, or files. The polynomial coefficients may be received at the same time. According to a preferred embodiment, the receiving end only has one time counter whose value is stored when a synchronization mark is received from either link. When the next signal, synchronization, or trigger arrives, a new time value may be stored in the next memory location or in the memory location already in use. The target position polynomial(s) and the actual position polynomial(s) may be differentiated and calculated at the receiving end. Similarly, new polynomials may be formed, such as the difference between the actual position and target position polynomials, their sum, division, multiplication, integration and/or derivation. Polynomials can thus, for instance, be multiplied by each other or by constants. After this, the terms of the new polynomial, for instance the difference between the actual position and target position polynomials, may be grouped in relation to the time variable t. Thus, the difference may be presented at an arbitrary time instant as the time counter proceeds to another value. After this, one or more signals 2-26 may be produced for the controlling element, i.e., PID control, for instance, may be formed using calculations. A signal may be formed of two or more polynomials, or each signal may have one polynomial. Two polynomials may be formed for instance by forming one by using the coefficients 2-24a and time information 2-14a and the other by using the coefficients 2-24b and time information 2-14b. The two polynomials to be sent on may be taken to a PID controller 2-28, for example, where one or more functions may be calculated for control. The functions may include the sum, difference, multiplication, division, derivation and integration of polynomials or combinations thereof, or the transfer of a polynomial on one or more control axes. The PID controller produces 2-30 for instance a continuous-time torque that may be converted 2-32 into a discretetime torque by calculating the polynomial value with a time variable value. When the coefficients of a continuous-time signal are known, matrix calculation need not necessarily be used in defining the polynomial value, even though it may be used, because the coefficients may depict a value. This value may be directed 2-34 to a frequency converter 2-36 that may produce 2-38 one or more signals for directing, adjusting or controlling a motor 2-40. In FIG. 2, the PID controller is drawn to belong to a receiver 2-103. Alternatively, it and the elements 2-32, 2-36, and 2-40 following it may belong to a receiver or a functional element after it. The receiver may also contain another transmitter that may transfer received coefficients modified or unmodified on to the next receiver.

Generally, according to FIG. 2, it is possible to use only one branch to transfer the continuous-time signal from the sending end to the receiving end. The continuous-time property can then be transferred by one or more transfer stations and possibly one or more link stations by transferring the continuous-time factors, such as polynomial coefficients or continuous-time parameters, to one or more receivers at the receiving end.

At the receiving end, one or more functions, such as a control function 2-26, may be produced for the control element 2-28 or for the next receiver on the basis of one or more continuous-time function or parameter or polynomial coefficient and/or one or more time counter value. If the function is transferred on, the next receiver may obtain part of the coefficients from the first sender and part of the coefficients from the second sender, etc.

The continuous-time property may also be described by other means than a polynomial. The description may be an arbitrary continuous-time function, such as a trigonometric function or a fourier set and its parameters, in which case a quantity is received as a function of time, for instance; the quantity is adapted to a first fourier function to obtain values of the coefficients of a first continuous-time signal; and the values of the coefficients of the first continuous-time signal are transferred via a first data transfer link to one or more receivers.

Even though the quantity is depicted as a function of time, it may also be depicted as a function of some other variable, such as temperature or radiation amount, or in such a manner that the temperature or radiation amount is depicted as a function of time. At the receiving end, a polynomial may be used to do an arbitrary calculation for one or more quantities in continuous-time format, such as polynomial format, or in fourier format. Thus, it is possible to transfer the signal data in the method and apparatus to one or more receivers by setting 2-2 the quantity as a function of time, transferring 2-6 the quantity to a first element 2-10 to arrange the quantity into a first polynomial in order to obtain polynomial coefficients for a first continuous-time signal 2-11a, and transferring 2-20 the polynomial coefficients of the first continuous-time signal via a first data transfer link 2-20 to one or more receivers. In other words, the quantity is received (2-6) as a function of time, the quantity is arranged (2-10) into the first polynomial to obtain values of the polynomial coefficients of the first continuous-time signal (2-11a), and the values of the polynomial coefficients of the first continuous-time signal are transferred via the first data transfer link (2-20) to one or more receivers. According to a preferred embodiment, a first receiving end receives continuous-time factors from a first transmitter, modifies them, and transfers them on to a second receiving end. The second receiving end may also receive from a second transmitter second continuous-time factors, modify them, and combine the second continuous-time factors with the first continuous-time factors. Here, various modifications, combinations, and concatenations are possible and may involve one or more signals, parameters, factors, or parts thereof.

It should also be noted that when arranging the quantity into a first or second function to obtain continuous time factors, the quantity may be discrete-time or continuous-time. A discrete-time quantity is adapted to be continuous-time, and a continuous-time quantity may be left as it is or it may be adapted further using different mathematical procedures, predictions, or models.

Finally, as described above, at the receiving end, the coefficients, such as polynomial coefficients, may be processed in many different ways to produce a continuous-time function, such as a polynomial, and further a control signal.

The apparatus according to FIG. 2 for transferring signal data may be arranged to receive 2-6 a quantity as a function of time, to arrange 2-10 a quantity into a first polynomial to obtain values of the polynomial coefficients of a first continuous-time signal 2-11a, and to transfer 2-20 the values of the polynomial coefficients of the first continuous-time signal via a first data transfer link 2-20 to one or more receivers. The transmitting device may have one or more branches, whereby in the case of a two-branch transmitting device, a target value is obtained from the first branch and a measured value is obtained from the second branch in accordance with the invention and its preferred embodiments. Alternatively, there may be two or more transmitters, whereby in the case of two transmitters, the first transmitter transfers to a receiver a target value and the second transmitter transfers a measured value in accordance with the invention and its preferred embodiments.

A device for receiving signal data may be configured to receive 2-20 values of the polynomial coefficients of a first continuous-time signal from the above device to a polynomial coefficient element 2-24a, to receive 2-22 values of the polynomial coefficients of a second continuous-time signal from the above device to a polynomial coefficient element 2-24b, to receive 2-11a a first synchronization mark from the first element 2-10 or some other element, for instance, to store the value of a time counter 2-14a at the time of receipt, to receive 2-11b a second synchronization mark from a second element 2-12 or some other element, for instance, to store the value of a time counter 2-14b at the time of receipt, and to produce one or more control functions 2-26 for a control element 2-28 on the basis of one or more continuous-time polynomial coefficient value and/or one or more time counter value in the receiving end.

Figure 3:
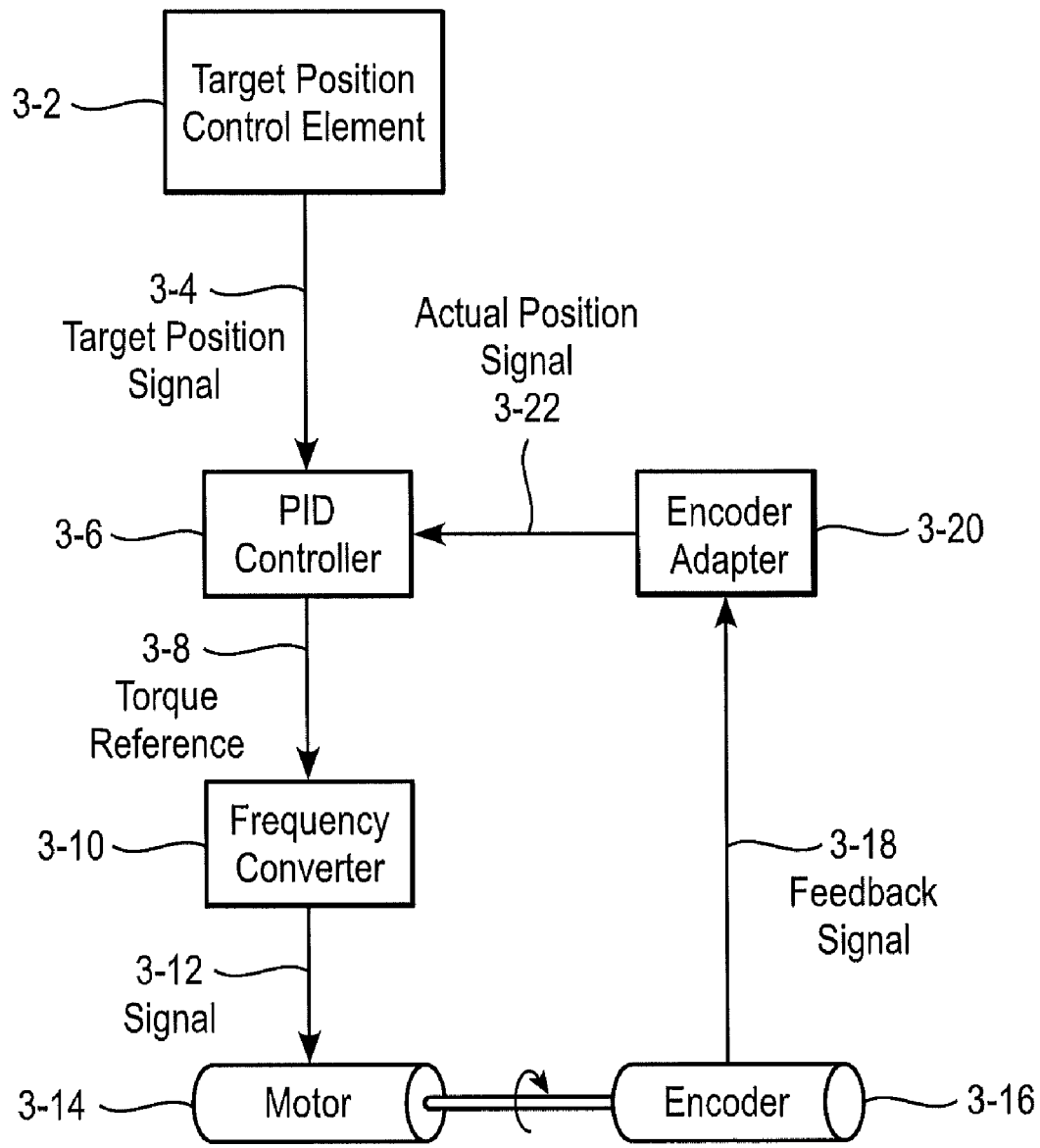
FIG. 3 shows equipment for the implementation of position control according to the invention and its preferred embodiments.

FIG. 3 shows continuous-time equipment or a component thereof for implementing position control or the control of some other quantity according to the invention and its preferred embodiments. A target position control element 3-2 produces a target position signal 3-4 that is directed to a PID controller 3-6. A torque reference 3-8 exiting the controller is directed to a frequency converter 3-10 and a signal 3-12 from the frequency controller on to a motor 3-14. An encoder 3-16 connected to the motor may provide a feedback signal 3-18 to an encoder adapter 3-20 that produces an actual position signal 3-22 to the PID controller 3-6.

The PID controller and/or encoder adapter may be part of the frequency converter or belong to the same hardware entity with it. Alternatively, one or more parts may belong to different entities. According to an embodiment, a motion controller is separate from the frequency converter and calculates the speed and/or torque reference to be sent to the frequency controller to achieve the desired position.

A physical data transfer channel may contain one or more, for instance two, main components: the exact temporal synchronization of the sending and receiving stations and the transfer of numerical, for instance digital, information. Temporal synchronization means that a certain internal and/or external time stamp, signal, trigger, or pulse is present at the sending and receiving ends at the same time as exactly as possible. In practice, this may be implemented, for instance, by a separate synchronization conductor (sync conductor) between two circuit boards.

According to a preferred embodiment, a measured signal and/or sample queues of a reference value position are approximated with a second-, third-, fourth-, or fifth-degree polynomial, for instance. The degree of the polynomial has no specific limitation, but the higher the degree is, the more complicated the calculations are. The polynomial coefficients, i.e., the track parameters, are defined at the sending end, and only they are transferred to the receiving end. Samples need not be transferred even though then can be transferred to the receiving end. A time stamp provides a temporal reference point, in the environment of which a polynomial represents a signal. According to another preferred embodiment, a measured signal and/or sample queues of a reference value position are approximated with a trigonometric function, and/or fourier set and its parameters, for instance. Polynomials may then also be used.

As described above, when the receiving end needs to know the signal value at an arbitrary time instant prior to the sampling time or immediately after it (prediction), the value of the polynomial is calculated in such a manner that the time variable obtains its value in relation to a certain time stamp. In other words, it is assumed that at the receiving end, where the value of the polynomial is to be calculated, the time counter t increases continuously. The memory contains the polynomial whose time variable is known to have been zero when the value of the time counter t was tm. The value of the polynomial may now be calculated with any value of the time counter t, when the time variable of the polynomial is set to (t−tm).

The receiving end has a PID controller, for instance, that contains a time counter. Its momentary value is t. When the synchronization signal of the measured position information arrives, the value t of the counter is stored into the variable tm. After this, the measured position information may be presented with the polynomial $Pm = Am^*(t-tm)^2 + Bm^*(t-tm) + Cm$, wherein Am, Bm, and Cm are the received polynomial coefficients of the measured position information. Correspondingly, when the synchronization signal of the target position information arrives, t is stored into the variable tt, and after this the target position information may be presented with the polynomial $Pt=At*(t-tt)^2+Bt*(t-tt)+Ct$, wherein At, Bt, and Ct are the received polynomial coefficients of the target position information. Tt and Tm may be stored at time instants that are independent of each other. After this, calculations may be performed with the polynomials without limiting them to a certain time instant t. For instance, the sum Pm+Pt of the polynomials at an arbitrary moment is $$Am^*(t-tm)^{\wedge}2 + Bm^*(t-tm) + Cm + At^*(t-tt)^{\wedge}2 + Bt^*(t-tt) + Ct =$$

$$Am^*(t^{\wedge}2 - t^*tm + tm^{\wedge}2) + Bm(t-tm) + At(t^{\wedge}2 - t^*tt + tt^{\wedge}2) + Bt^*(t-tt) +$$

$$Cm + Ct = t^{\wedge}2^*(Am + At) + t(-Am^*tm + Bm - At^*tt + Bt) +$$

$$(Am^*tm^{\wedge}2 - Bm^*tm + At^*tt^{\wedge}2 - Bt^*tt + Cm + Ct).$$

This shows that the parts independent of t may be precalculated only once (always when the polynomial coefficients or tm or tt change), and after this, the sum value of the polynomials is obtained with an arbitrary value of t simply by calculating the value of the sum polynomial.

The time derivative of the sum of polynomials calculated above is $$2*t*(Am+At)+(-Am*tm+B-At*tt+Bt).$$

The difference, product, derivation, and other calculation operations of the polynomials may be done in a corresponding manner, and they may be combined. This way it is possible to implement an entire PID controller by using only polynomials and not samples bound to individual time instants. The torque reference produced by the PID controller is also obtained as a function of the time counter t, so its value may be calculated as often as and whenever needed regardless of the other timings of the system. The delay caused by the calculation operations is also removed by compensation.

It should be noted that the data transfer of polynomial coefficients need not be temporally exact or delay-free. It is enough to know in which synchronization mark environment they are valid. Therefore, the synchronization marks need to be distinguishable from each other or they need to arrive so infrequently that two synchronization marks cannot be mixed with each other. More extensively, the invention makes it possible to transfer the same polynomial coefficients to several different receivers simultaneously, and different calculation operations are possible in polynomial format between them. The result may be calculated at different receivers independently. As a whole, the sampling frequency and data transfer delay lose significance in the entire system.

As stated above, it should be noted that the data transfer of track parameters need not be temporally exact or delay-free. It is enough to know in which time stamp environment they are valid. Therefore, the time stamps need to be distinguishable from each other or they need to arrive so infrequently that two time stamps cannot be mixed with each other.

According to a preferred embodiment, on the basis of five consecutive samples, the sending end calculates that the signal uses the polynomial:

$$Y=200-180*t+193*t^{\wedge}2-40*t^{\wedge}3+12*t^{\wedge}4,$$

wherein t is time in comparison with time stamp number 9523. For instance, exactly at the time stamp, the value of the signal is 200 (t=0). Thus, the polynomial has five unknown coefficients defined on the basis of five known samples.

Time stamp 9523 is at the sending and receiving ends at the same time at an accuracy of a few nanoseconds. Let us assume that the receiving end has a time counter t independent of the sending end. As the time stamp arrives, the value of the time counter at the receiving end, for instance t=423 ms, is stored into memory: the value of t is tm, wherein tm=423. After this, as the time counter value t increases at the receiving end, function Y can be presented as:

$$Y=200-180*(t-tm)+193*(t-tm)^{\wedge}2-40*(t-tm)^{\wedge}3+ 12*(t-tm)^{\wedge}4.$$

The receiving end may by chance need to know the momentary value of the signal when the value of the time counter t is 423.4 ms, for instance. The receiving end then calculates the value of the polynomial when t=423.4, i.e., t−tm=0.4, and obtains the result of 155.

If Y depicts position information, the equation of speed at the receiving end is:

Speed $dY/d(t-tm)=-180+2*193*(t-tm)-3*40*(t-tm)^{\wedge}2+4*12*(t-tm)^{\wedge}3.$ If the sending end has speed and position information of a target to be measured, such as a goods handling carrier of an automated warehouse, a polynomial of four unknowns can be defined using two speed and two position samples. An encoder adapter may be a typical application for this.

The polynomial may be re-calculated after each arrived sample. It the previous polynomial has been calculated from samples 108, 109, 110, 111, and 112, and sample number 113 arrives after this, the next polynomial may be calculated on the basis of samples 109, 110, 111, 112, and 113. Approximation becomes the better the higher-degree polynomial is used. On the other hand, transferring several coefficients takes longer and/or requires more data transfer capacity. Defining coefficients for a high-degree polynomial is also a computationally demanding task. Therefore, even a second-degree polynomial could be suitable for an embedded system.

According to the invention and its preferred embodiments, the transfer of polynomial coefficients to an essentially different position may be done over a relatively slow, for example 115-kbit/s, UART data transfer channel. In addition, the use of once-made polynomial coefficients by several different receivers at independent times is possible. Polynomial coefficients may be defined using not only the original measuring object variable, but also the derivation of the variable or some other function and a measured position and speed, for instance. The polynomial may also be differentiated one or more times, for instance twice, at the receiving end.

Figure 4:
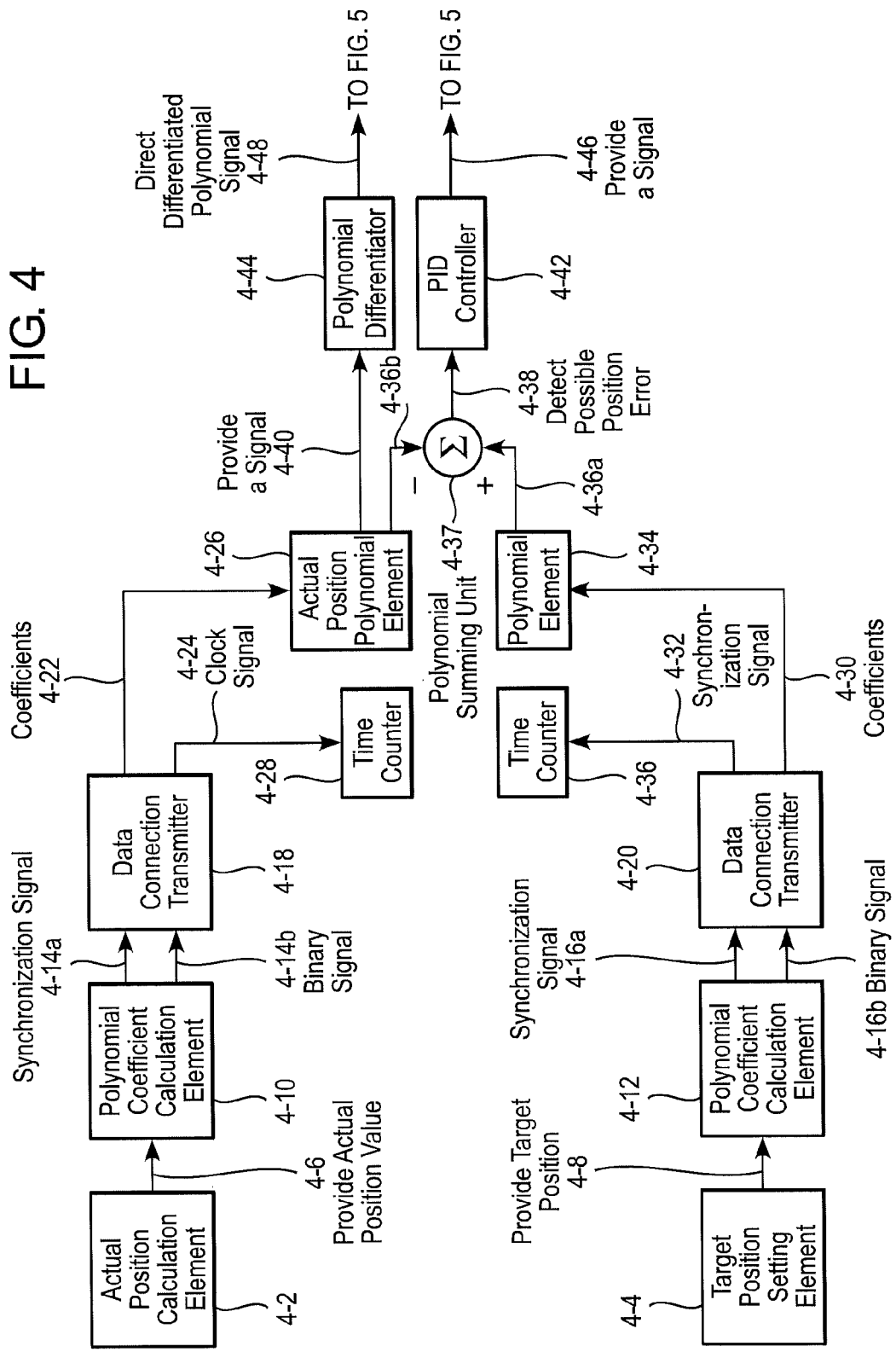
FIG. 4 shows a PID controller according to the invention and its preferred embodiments.

FIG. 4 shows a PID controller of the invention and its preferred embodiments, or a part thereof. In it, an element 4-2 calculates the actual position value of the target and provides 4-6 this information to an element 4-10 for the purpose of calculating polynomial coefficients. A synchronization signal 4-14b and the polynomial coefficients are input to a data connection transmitter 4-18 in one or more steps in the form of a numerical signal, for instance as a binary signal 4-14a, and the transmitter directs the coefficients 4-22 on to an actual position polynomial element 4-26 and the synchronization signal, such as a clock signal 4-24, to a time counter 4-28.

In FIG. 4, a target position setting element 4-4 calculates the value of the target position and provides 4-8 this information to an element 4-12 for the purpose of calculating polynomial coefficients. A synchronization signal 4-16a and the polynomial coefficients are input to a data connection transmitter 4-20 in one or more steps in the form of a numerical signal, for instance as a binary signal 4-16b, and the transmitter directs the coefficients 4-30 on to a set position, i.e., the position target value, polynomial element 4-34, and the synchronization signal 4-32 to a time counter 4-36. The measured value and/or target value or signal may depict time-dependent data from n sources.

Figure 5:
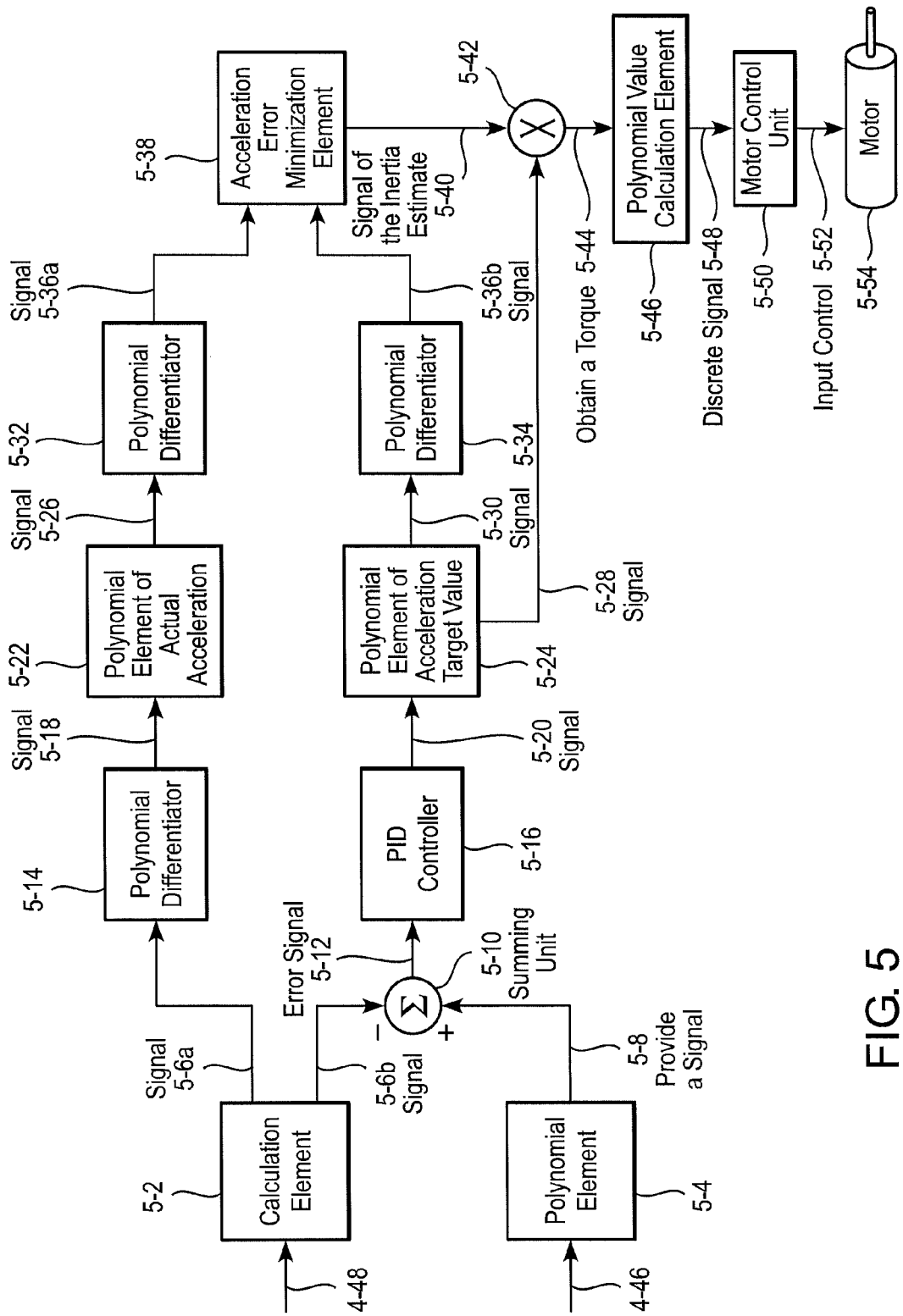
FIG. 5 shows a PID controller according to the invention and its preferred embodiments.

The sum of the set position and actual position polynomials is calculated in a polynomial summing unit 4-37. According to an implementation, the polynomial 4-36b of the actual position is summed negatively, i.e., separated from the polynomial 4-36a of the set position. A possible position error 4-38 is directed to a PID controller 4-42 to control the position or position value. The PID controller may provide a signal 4-46 to a set polynomial element 5-4 of speed (FIG. 5).

The actual position polynomial element 4-26 may also provide a signal 4-40 to a polynomial differentiator 4-44, wherein the signal may refer to forwarding coefficients representing a continuous-time polynomial from one block or element to another. A differentiated polynomial signal may be directed 4-48 to a calculation element 5-2 of an actual speed polynomial (in FIG. 5).

Two or more polynomials or parts of a polynomial or polynomials may be combined in the polynomial summing unit in accordance with one or more predefined operations. As described above, the target value polynomial and the actual position polynomial may have been obtained by calculating as follows, for instance: let us assume that we know the polynomial coefficients, the polynomial represented by which was temporally at its zero point, when the local time counter t value was tm. The polynomial may then be presented as a function of the time variable (t–tm); $Y = a*(t-tm)^3 + b*(t-tm)^2 + c*(t-tm) + d$, wherein tm is constant until the following time stamp and coefficients arrive, and a, b, and c are arbitrary coefficients.

A new polynomial may now be created, in which the brackets and powers have been processed and terms re-grouped so that the polynomial is purely a function of the time variable t. When this operation is done to both the target position polynomial and the measured position polynomial, the polynomials of the same time variable function are obtained, and calculations may be made between them.

FIG. 5 shows a PID controller of the invention and its preferred embodiments, or a part thereof. The PID controller (in FIG. 4) provides a signal 4-46 to an element 5-4 of the speed target value polynomial, i.e., the set polynomial, and the element may serve as a temporary storage for polynomial information, for instance, and provide a signal 5-8 to a summing unit 5-10. The result of the PID control 4-42 may alternatively also be sent directly to the summing unit 5-10. Correspondingly, the differentiated signal 4-48 may be directed to the temporary storage element 5-2 of the actual speed polynomial or to directly to the summing unit 5-10 without any storage and/or calculation. From the element 5-2 a signal 5-6b is directed to the summing unit and a signal 5-6a to a polynomial differentiator 5-14. In the summing unit, the actual polynomial of speed may be summed negatively and the speed setting polynomial positively. An error signal 5-12 of speed may be directed to one or more second PID controllers 5-16 to control speed.

From the speed polynomial differentiator 5-14, a signal 5-18 may be directed to a polynomial element 5-22 of actual acceleration, and from the element in question a signal 5-26 to a second polynomial differentiator 5-32, and from there a signal 5-36a to an element 5-38 to minimize any acceleration error by controlling an inertia estimate, for instance. From the PID controller 5-16, a signal 5-20 may be directed to the polynomial element 5-24 of an acceleration target value, i.e., set value. In other words, the signal 5-20 is a starting value, i.e., torque value, of the PID controller of speed. An inertia value of one, for instance, may be used. Adaptation to different moments of inertia may then be made by adjusting the P, I, and/or D parameters of the speed controller.

The invention and its preferred embodiments may be implemented in many different ways. The central idea is that whatever the alternative, the calculations are made using polynomials or other continuous-time mathematical functions. According to one interpretation alternative, the starting value of the speed PID controller is acceleration and this is modified to torque taking into consideration among other things the estimated inertia, and the torque is provided to the motor. Alternatively, it may be assumed that acceleration=torque, i.e., inertia is 1. Then if inertia is in reality other than one, the PID parameters are wrong and need to be fine-tuned. The PID control parameters may, thus, only apply to one inertia value at a time. If the motor axis has more mass, the control is faulty. In this alternative, there is no inertia estimation.

The moment of inertia indicated by the motor may, thus, be examined, estimated, and controlled in many different ways. One alternative is to differentiate both the actual acceleration and target acceleration and estimate the moment of inertia in the motor by means of derivatives. Otherwise, constant load acting on the motor, for instance a weight hanging from a crane, may mess up the moment of inertia estimation. It is also possible to estimate one or more physical quantities in motor control. In addition to the moment of inertia, the constant load, such as crane load or elevator mass, are also estimable. The estimation of inertia may be done with polynomials.

According to the invention and its preferred embodiments, the internal calculations of the PID controller are made using polynomials and not with individual discrete-time samples. Alternatively, they may be done using both discrete-time samples and continuous-time values. In frequency converters, the position control PID controller may also only be a P controller, in which case the two other terms, I and D, are zero. The compensation of the moment of inertia, the obtaining of torque from acceleration, and the estimation of the moment of inertia may be done in polynomial form.

The polynomial element 5-24 of acceleration target value transfers a signal 5-30 to a third polynomial differentiator 5-34, a signal 5-36b from which is directed to an element 5-38, which is for instance an acceleration error calculation element 5-38 or acceleration storage and/or processing element 5-38.

According to a preferred embodiment, the acceleration error, difference, is not calculated. The differentiators 5-32 and 5-34 are needed specifically due to these acceleration changes. Inertia may be estimated in continuous time instead of discrete time by checking how much the torque calculated from a previous inertia estimate and target acceleration and given to the motor changed, and how much the actual acceleration changed as a result. Inertia may be estimated from the relationship between these two.

A signal coming from the element 5-38, a signal 5-40 of the inertia estimate, for instance, and a signal 5-28 from the acceleration set point polynomial element may be multiplied to obtain a torque 5-44 for the polynomial value calculation element 5-46, a discrete signal 5-48 provided by which may be input into a control unit 5-50 of the motor. Finally, the control generated by the unit may be input 5-52 to the motor 5-54.

According to an alternative embodiment, instead of transferring the signal 5-26 from the element 5-22 to the second polynomial differentiator 5-32 and of transferring the signal 5-30 from the element 5-24 to the third polynomial differentiator 5-34, the signals may be transferred directly to the summing unit for the purpose of calculating the acceleration error. To achieve this, one signal, for instance the signal 5-26, may be subtracted from a second signal, for instance the signal 5-30.

According to the invention and its preferred embodiments, data is kept in continuous-time even over the data transfer link. Both the one or more data transfer links and the one or more PID controllers act in continuous time or in a combination of continuous time and discrete time. The delay and temporal uncertainty caused by digital data transfer may be eliminated from the sampled signal, such as speed or position information.

The transfer of measured and sampled signal data in a data link may be implemented by approximating the signal with a polynomial function and transferring only the polynomial coefficients. It is then possible to calculate at the opposite end the value of the polynomial and, therefore, the value of the original signal at an arbitrary moment in the environment of the examination time point. It is also possible to predict the near future at a limited accuracy, and this then enables an apparently delay-free data transfer, and the compensation and minimization of the data transfer delay.

The invention and its preferred embodiments may be implemented in many different ways, for instance between two FPGA circuits that may reside on the same circuit board or on different ones. The functionality may be implemented for instance with programmable logic, a signal processor or a combination thereof.

The invention and its embodiments are not specific to a given communications system, but may be used for instance in a circuit-switched system, such as GSM (Global System for Mobile Communications), or packet-switched system, such as UMTS (Universal Mobile Telecommunications System), and systems according to the IEEE 802.11 standard: WLAN (Wireless Local Area Networks), HomeRF (Radio Frequency), or BRAN (Broadband Radio Access Networks). The invention and its preferred embodiments may also be applied to networks such as IrDA (Infrared Data Association) or Bluetooth.

The invention and its preferred embodiments may be implemented by a computer program that comprises program code means adapted to perform any of the necessary steps when the program is run on a processor. It is also possible to produce a computer program product that comprises program code means stored on a computer-readable memory or medium, the program code means being adapted to perform any of the necessary steps when the program is run on a computer or processor.

All modifications and configurations necessary to implement the functionalities of the embodiments may be performed as routines that are implemented as added or updated program routines, ASICs (Application Specific Integrate Circuit), and/or programmable circuits. Program routines which may also be called software products, and include applets and macros, may be stored on a device-readable data storage medium, and they may contain program instructions for performing certain tasks. Program routines may be loaded onto a device. The device and its parts may be configured as a computer and contain a memory providing a memory area used for arithmetic operations. For instance, a processor may contain a central processor unit. The memory may be a detachable memory attached to the device.

According to the invention and its preferred embodiments, it is possible to produce the transfer of a continuous-time function and/or its parameters, such as polynomial coefficients, to an essentially different place over a relatively slow data transfer channel, the use of once-made polynomial coefficients by several different receivers at independent time instants at essentially different points, and the execution of calculation operations with a PID controller, for instance, in continuous-time polynomial format, and transfer to discrete-time samples only in the final product.

The method and system of the invention provides several advantages. The system and device according to them are simple. The delay in data transfer does not cause an error in the measuring result, because data transfer is virtually immediate. Systems operating on different sampling frequencies may be very easily and flexibly combined. The implementation of a system using a link is simplified when no extrapolation and re-sampling is necessary. The structure and/or functionality may be encapsulated in a "black box" especially in an embodiment with a simple reception and no PID control system. With PID control, the actual functionality is inside the black box. In addition, if the quantity to be transferred is position information, the receiving end may easily find out the speed information on the basis of the same parameters by simply differentiating the polynomial. The same applies to acceleration. It is, thus, possible to transfer position, speed, and acceleration at the same time. In addition, it should be noted that the derivation of a polynomial function is very simple. This also provides an advantage in the use of data transfer capacity in comparison with the alternative where position, speed, and acceleration information are transferred separately. The method may also be applied to existing synchronized links, such as Ethercat and Sercos, because they offer both a time-synchronization property and the cyclic forwarding of parameters. The calculation could then be made in a signal processor.

The invention and its preferred embodiments also provide the advantages that, because the calculation of the polynomial value for a single time instant is a relatively simple calculation operation, the delay from the request to obtaining the signal value is relatively short and predictable, when compared with requesting a discrete-time numerical value over a slow remote connection.

Further according to the invention and its preferred embodiments, it is possible to avoid the creation of unnecessary delay between the sending and receiving ends as well as receiving outdated, and thus faulty, sample values. Adjusting to different sampling rates is also simple.

If several receivers want to have the same position information in a ring-shaped data transfer link, for example, the definition of the polynomial coefficients that require heavier calculation only needs to be done once at the sending end, and each receiver does the computationally lighter polynomial value definition. This way, the total calculation requirement of the system is smaller than in conventional extrapolation. The same advantage is achieved, if the same position information is required at the same receiving station at several different sampling frequencies.

According to the invention and its preferred embodiments, the polynomial coefficients may be transferred through a data transfer link for a relatively long distance, for instance from one side of an industrial hall, transportation means, or extensive space to the other side, or from one space to another, and a first or second derivation can also be done to the same polynomial.

A disadvantage of the invention may be that the link of the invention may become heavy in resource utilization and logic due to possible multiplications and divisions. In addition, situations in which the measured signal behaves in an unpredictable manner, a signal received in the form of a polynomial equation may be faulty, and the receiver does not receive any indication of this unreliability. If the receiving end only requires position information, the transfer of several polynomial coefficients may require even more capacity than the transfer of position information only.

It is obvious to a person skilled in the art that as technology advances, the basic idea of the invention may be implemented in many different ways. The invention and its embodiments are, thus, not limited to the examples described above, but may vary within the scope of the claims.

The invention claimed is:

1. A method of motor drive control for transferring signal data to one or more receivers, comprising:
   receiving a quantity as function of time,
   arranging the quantity into a first polynomial to obtain values of polynomial coefficients of a first continuous-time signal,
   transferring the values of the polynomial coefficients of the first continuous-time signal via a first data transfer link to one or more receivers,
   transferring the values of the polynomial coefficients of the first continuous-time signal to a first polynomial element of a receiver,
   transferring the values of the polynomial coefficients of the second continuous-time signal to a second polynomial element of the receiver,
   receiving a synchronization mark from a first element,
   storing the value of a time counter at the time of receipt,
   receiving a synchronization mark from a second element,
   storing the value of a time counter at the time of receipt, and
   producing one or more control functions to a control element on the basis of the values of the coefficients of one or more continuous-time polynomials and/or one or more time counter values of the receiving end for controlling the motor drive.

2. The method as claimed in claim 1, comprising:
   receiving a target value of the quantity as a first function of time,
   arranging the target value into the first polynomial to obtain the values of the polynomial coefficients of the first continuous-time signal,
   receiving a measured actual value of the quantity as a second function of time,
   arranging the actual value into a second polynomial to obtain value of polynomial coefficients of a second continuous-time signal,
   transferring the values of the polynomial coefficients of the first continuous-time signal via a first data transfer link to one or more receivers, and
   transferring the values of the polynomial coefficients of the second continuous-time signal via a second data transfer link to one or more receivers.

3. The method as claimed in claim 1, wherein the control function may be a sum, difference, multiplication, division, derivation, and/or integration of the polynomials or a combination thereof.

4. The method as claimed in claim 1, comprising:
   obtaining from the control element a continuous-time control, and
   converting the continuous-time control to a discrete-time control.

5. The method as claimed in claim 1, wherein the discrete-time control is torque control and that this controls a frequency converter that produces one or more signals for directing, adjusting, or controlling a motor.

6. The method as claimed in claim 1, wherein the first and second data transfer link is the same data transfer link.

7. The method as claimed in claim 1, wherein the first and/or second data transfer link comprises the exact temporal synchronization of the sending and receiving ends and the forwarding of numerical information.

8. The method as claimed in claim 1, comprising:
   approximating a target signal and/or measured signal with a third- or fourth-degree polynomial.

9. The method as claimed in claim 1, comprising:
   calculating the value of a polynomial in such a manner that a time variable obtains its value in relation to a given internal and/or external time stamp, signal, trigger, or a combination thereof.

10. A motor drive device for transferring signal data, comprising:
    a receiver for receiving a quantity as a function of time via a first data transfer link;
    a processor for arranging the quantity into a first polynomial to obtain values of polynomial coefficients of a first continuous-time signal, and for transferring the values of the polynomial coefficients of the first continuous-time signal via the first data transfer link to the receiver; and
    a non-transitory computer readable storage medium for storing computer executable instructions, which when in communicative contact with a computer causes the processor to execute the steps of:
    transferring the values of the polynomial coefficients of the first continuous-time signal to a first polynomial element of a receiver,
    transferring the values of the polynomial coefficients of the second continuous-time signal to a second polynomial element of the receiver,
    receiving a synchronization mark from a first element,
    storing the value of a time counter at the time of receipt,
    receiving a synchronization mark from a second element,
    storing the value of a time counter at the time of receipt, and
    producing one or more control functions to a control element on the basis of the values of the coefficients of one or more continuous-time polynomials and/or one or more time counter values of the receiving end for controlling the motor drive.

11. The device as claimed in claim 10, comprising:
    wherein the non-transitory computer readable storage medium causes the processor to execute:
    receiving a target value of the quantity as a first function of time;
    arranging the target value into a first polynomial to obtain the values of the polynomial coefficients of the first continuous-time signal;
    measuring an actual value of the quantity as a second function of time;
    transferring the actual value to a second element to arrange the actual value into a second polynomial to obtain values of polynomial coefficients of the second continuous signal;
    transferring the values of the polynomial coefficients of the first continuous-time signal via the first data transfer link to one or more receivers; and
    transferring the values of the polynomial coefficients of the second continuous-time signal via the second data transfer link to one or more receivers.

12. A motor drive device for receiving signal data, comprising:
    receiving values of polynomial coefficients of a first continuous-time signal from a device of claim 10 to a polynomial coefficient element;
    receiving values of polynomial coefficients of a second continuous-time signal from the device of claim 10 to a polynomial coefficient element;

receiving a first synchronization mark from a first element;

storing a value of a time counter at the time of receipt;

receiving a second synchronization mark from a second element;

storing a value of a time counter at the time of receipt; and producing one or more control functions for a control element on the basis of one or more continuous-time polynomial coefficients and/or one or more time counter values of the receiving end for controlling the motor drive.

13. A tangible computer readable storage medium for motor drive control comprising instructions, that when executed by a computer, cause the computer to receive a quantity as function of time, arrange the quantity into a first polynomial to obtain values of polynomial coefficients of a first continuous-time signal, transfer the values of the polynomial coefficients of the first continuous-time signal via a first data transfer link to one or more receivers, transfer the values of the polynomial coefficients of the first continuous-time signal to a first polynomial element of a receiver, transfer the values of the polynomial coefficients of the second continuous-time signal to a second polynomial element of the receiver, receive a synchronization mark from a first element, store the value of a time counter at the time of receipt, receive a synchronization mark from a second element, store the value of a time counter at the time of receipt, and produce one or more control functions to a control element on the basis of the values of the coefficients of one or more continuous-time polynomials and/or one or more time counter values of the receiving end for controlling the motor drive.

* * * * *